United States Patent Office 3,113,971
Patented Dec. 10, 1963

3,113,971
METHOD FOR THE HYDROLYSIS OF HYDRAZONES
Bernard Loev, Broomall, Pa., assignor to Smith Kline & French Laboratories, Philadelphia, Pa., a corporation of Pennsylvania
No Drawing. Filed Aug. 15, 1960, Ser. No. 49,442
4 Claims. (Cl. 260—593)

This invention relates to a novel and advantageous method for the hydrolysis of hydrazones.

Aldehydes and ketones are frequently isolated from reaction mixtures in the form of their hydrazone derivatives and then recovered in a purified condition by acid hydrolysis of the hydrazone derivatives. The hydrolysis of hydrazones is usually effected by refluxing the hydrazone with a mineral acid such as hydrochloric or sulfuric acid or with a strong organic acid. Such hydrolysis usually requires prolonged contact of the hydrazone with the acid at elevated temperatures with the result that a sensitive hydrazone may be decomposed or that the hydrazone may be converted to the azine which is more difficult to hydrolyze.

An advantage of the method of this invention is that the hydrolysis of hydrazones is accomplished under very mild reaction conditions which diminishes the possibility of decomposition or conversion to azines. In addition, advantageously, the hydrazine liberated as a result of hydrolysis by the method of this invention is removed from the reaction mixture as the highly insoluble picric acid salt. Thus the isolation of the aldehyde or ketone is greatly facilitated.

This novel method of hydrolyzing hydrazones, in addition to providing a very advantageous means of preparing pure aldehydes and ketones, also serves as a diagnostic test for hydrazones. Thus the method of this invention has utility for experimental and research purposes for the identification of hydrazones in addition to its utility in the preparation of aldehydes and ketones.

According to the method of this invention a hydrazone of an aldehyde or ketone is hydrolyzed by treatment with at least an equal molar amount, preferably an excess, of picric acid in an organic solvent which is unreactive with hydrazine and in which the reactants are substantially soluble such as a lower alcohol, for example ethanol or isopropanol, an aromatic hydrocarbon such as benzene or toluene, a halogenated aliphatic hydrocarbon such as carbon tetrachloride or chloroform, or a lower aliphatic ether such as isopropyl ether. By a solvent "in which the reactants are substantially soluble" is meant one in which the reactants are sufficiently soluble to allow the reaction to proceed. The hydrolysis is often accomplished at room temperature. Occasionally it is convenient to heat the reaction mixture to about 40–60° C. for about 1–2 minutes. Obviously therefore a wide range of reaction temperatures can be utilized, however no particular advantage has been noted using temperatures outside of a range of from about 20° C.–75° C. The hydrazine salt of picric acid separates directly from the reaction mixture and is conveniently removed by filtration. The mother liquors of the reaction mixture contain the aldehyde or ketone which is isolated by standard techniques such as by crystallization, distillation, chromatography, etc.

The novel hydrolysis of this invention is generally applicable to a wide variety of organic hydrazines, for example, such as the hydrazones of alkyl, aryl, aralkyl or cycloalkyl aldehydes or ketones. Such hydrazones are represented by the following formula:

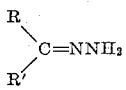

when:

R represents hydrogen, alkyl, aryl such as phenyl or substituted phenyl, aralkyl such as benzyl or phenethyl or cycloalkyl; and R' represents alkyl, aryl such as phenyl or substituted phenyl, aralkyl such as benzyl or phenethyl, cycloalkyl or, together with R, forms a ring such as a heterocyclic or a saturated alicyclic hydrocarbon ring.

The terms R and R' as defined above, when other than hydrogen, denote groups having from about 1–12 carbon atoms.

The following examples are not limiting but are illustrative of the method in accordance with this invention.

Example 1

A mixture of 13.5 g. of methyl 2-pyridyl ketone hydrazone in 150 ml. of ethanol is treated with 25.0 g. of picric acid in ethanol. The resulting mixture is heated to 50° C. for two minutes. The cooled mixture is filtered and the filtrate is passed through an alumina column. Evaporation of the alcohol leaves methyl 2-pyridyl ketone.

Example 2

Benzaldehyde hydrazone (12.0 g.) in 100 ml. of ethanol is treated with 22.9 g. of picric acid in ethanol at room temperature. The precipitate is filtered off and the filtrate is evaporated and distilled to give benzaldehyde.

Example 3

A chloroform solution of the hydrazone of benzophenone (1.9 g.) is treated with 2.5 g. of picric acid. The mixture is warmed to 50° C. The precipitate is filtered off and the filtrate is washed with water. Evaporation of the chloroform leaves benzophenone.

Example 4

A mixture of 0.86 g. of methyl ethyl ketone hydrazone and 150 ml. of methanol is treated with 2.2 g. of picric acid in methanol. Filtration and fractional distillation of the filtrate gives methyl ethyl ketone.

Example 5

An ethanol solution of the hydrazone of cyclopropyl methyl ketone (0.98 g.) is treated with an ethanol solution containing 2.3 g. of picric acid. The resulting mixture is heated to 60° C. Filtering and then distilling the filtrate gives cyclopropyl methyl ketone.

Example 6

Cyclohexanone hydrazone (1.1 g.) in 150 ml. of benzene is treated with 2.3 g. of picric acid in benzene. The mixture is heated to 55° C. Filtering and then removing the solvent by evaporation in vacuo leaves cyclohexanone as the residue.

Example 7

A solution of 1.6 g. of camphor hydrazone in isopropyl ether is treated with an isopropyl ether solution of 2.5 g. of picric acid. The mixture is heated to 50° C., then filtered. The filtrate is washed with water, concentrated in vacuo to give, as the residue, camphor.

Example 8

The hydrazone of n-heptaldehyde (1.3 g.) in isopropyl alcohol is treated with isopropanolic picric acid (2.3 g.). Warming the mixture on the steam bath for one minute, filtering and evaporating the solvent in vacuo gives n-heptaldehyde.

Example 9

Furfural hydrazone (1.1 g.) in 50 ml. of ethanol is warmed to 50° C. with 2.5 g. of picric acid in ethanol. The precipitate is filtered off. The filtrate is passed through an alumina column. The eluate is concentrated and distilled to give furfural.

Example 10

Fluorenone hydrazone (prepared by refluxing an alcoholic solution of fluorenone and 95.3 hydrazine for 1.5 hours, cooling and filtering, M.P. 145–7° C.) is dissolved in ethanol. To this chilled solution is added a cold alcoholic picric acid solution. The solution is heated to 40° C. for one minute then cooled. The yellow picric acid salt of hydrazine is filtered off, the filtrate is passed through a basic ion exchange resin to remove excess picric acid, and the filtrate is charcoaled and concentrated, giving fluorenone.

Example 11

A solution of 3-methyl-5-acetonylpyrazole hydrazone in ethanol is treated with excess picric acid solution. On heating, a bright yellow precipitate of the hydrazine salt of picric acid, M.P. 192° C., soon forms and is filtered. The filtrate is charcoaled, evaporated, and taken up in ether. The 3-methyl-5-acetonylpyrazole is isolated as the hydrochloride.

What is claimed is:

1. The method of hydrolyzing organic hydrazones having the following formula:

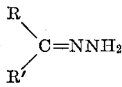

in which R is a member selected from the group consisting of hydrogen, alkyl, phenyl, benzyl, phenethyl and cycloalkyl and R′ is a member selected from the group consisting of alkyl, phenyl, benzyl, phenethyl, cycloalkyl and together with R and the carbon atom to which R and R′ are attached, a member selected from the group consisting of a fluorenylidene and a saturated alicyclic hydrocarbon ring, the terms R and R′ having up to 12 carbon atoms which comprises reacting said hydrazone with at least an equal molar amount of picric acid at about 20° C.–75° C. in an organic solvent which is unreactive with hydrazine and in which the said reactants are substantially soluble to give an organic carbonyl compound having the following formula:

in which R and $R_1$ are as defined hereabove.

2. The method of claim 1 in which the solvent is a member selected from the group consisting of a lower alkanol, an aromatic hydrocarbon, a halogenated aliphatic hydrocarbon and lower aliphatic ether.

3. The method of hydrolyzing benzaldehyde hydrazone which comprises reacting said hydrazone with at least an equal molar amount of picric acid at about 20° C.–75° C. in an organic solvent which is unreactive with hydrazine and in which the said reactants are substantially soluble to give benzaldehyde.

4. The method of hydrolyzing methyl ethyl ketone hydrazone which comprises reacting said hydrazone with at least an equal molar amount of picric acid at about 20° C.–75° C. in an organic solvent which is unreactive with hydrazine and in which the said reactants are substantially soluble to give methyl ethyl ketone.

References Cited in the file of this patent

Krauz: Chem. Abstracts, vol. 5, page 1954 (1911).
Thannhauser et al.: Chem. Abstracts, vol. 16, page 278 (1922).
Karrer: Organic Chemistry (Elsevier, 4th Ed.), page 449 (1950).